United States Patent
Wittmann

Patent Number: 5,667,737
Date of Patent: Sep. 16, 1997

[54] METHOD OF MANUFACTURING AN INJECTION MOLDED SHOE

[75] Inventor: Walter Wittmann, Köflach, Austria

[73] Assignee: Koflach Sport Gesellschaft m.b.H. & Co. KG, Wagrain, Austria

[21] Appl. No.: 614,319

[22] Filed: Mar. 12, 1996

Related U.S. Application Data

[60] Continuation of Ser. No. 166,507, Dec. 13, 1993, abandoned, which is a division of Ser. No. 47,878, Apr. 15, 1993, abandoned, which is a continuation of Ser. No. 825,934, Jan. 27, 1992, abandoned.

[30] Foreign Application Priority Data

Jan. 28, 1991 [AT] Austria ................................ 183/91

[51] Int. Cl.$^6$ ........................ B29C 45/13; B29C 45/16
[52] U.S. Cl. ................... 264/40.1; 264/245; 264/255; 264/328.8; 425/129.2; 425/130
[58] Field of Search ................................ 264/244, 245, 264/255, 328.8, 294, 40.1, 40.4; 425/129.1, 129.2, 130

[56] References Cited

U.S. PATENT DOCUMENTS

| | | | |
|---|---|---|---|
| 2,470,089 | 3/1949 | Booth . | |
| 3,160,921 | 12/1964 | Ludwig | 264/244 |
| 3,663,679 | 5/1972 | Barre et al. | 264/244 |
| 3,718,994 | 3/1973 | Spier . | |
| 3,807,062 | 4/1974 | Spier . | |
| 3,853,446 | 12/1974 | Hostettler et al. | 264/328.5 |
| 3,896,202 | 7/1975 | Palau | 264/244 |
| 3,950,483 | 4/1976 | Spier | 264/245 |
| 3,958,291 | 5/1976 | Spier | 264/244 |
| 4,005,167 | 1/1977 | Stern | 264/245 |
| 4,276,254 | 6/1981 | Combronde . | |
| 4,340,990 | 7/1982 | Seynhaeve . | |
| 5,053,176 | 10/1991 | Cameron et al. | 264/245 |
| 5,211,898 | 5/1993 | Shinmoto | 264/245 |
| 5,223,191 | 6/1993 | Tatsuno et al. | 264/245 |

FOREIGN PATENT DOCUMENTS

| | | |
|---|---|---|
| 95.015 | 3/1970 | France . |
| 1933570 | 1/1971 | Germany . |
| 26 36 355 | 2/1978 | Germany . |
| 30 24 808 | 12/1981 | Germany . |
| 1005502 | 1/1989 | Japan . |
| 1020801 | 1/1989 | Japan . |
| 623 463 | 6/1981 | Switzerland . |

*Primary Examiner*—Angela Ortiz
*Attorney, Agent, or Firm*—Collard & Roe, P.C.

[57] ABSTRACT

A sport shoe or boot comprises an integral outer shoe including a plurality of shaped portions of at least two different synthetic resin materials, adjacent portions of different synthetic resin materials being interconnected in overlapping transition areas shaped to fit each other. The outer shoe is manufactured by injecting the different synthetic resin materials in plasticized condition and at staggered intervals into a mold cavity at pre-selected portions thereof, permitting the injected synthetic resin materials to harden in the mold cavity to form the integral outer shoe, and removing the outer shoe from the mold cavity.

5 Claims, 3 Drawing Sheets

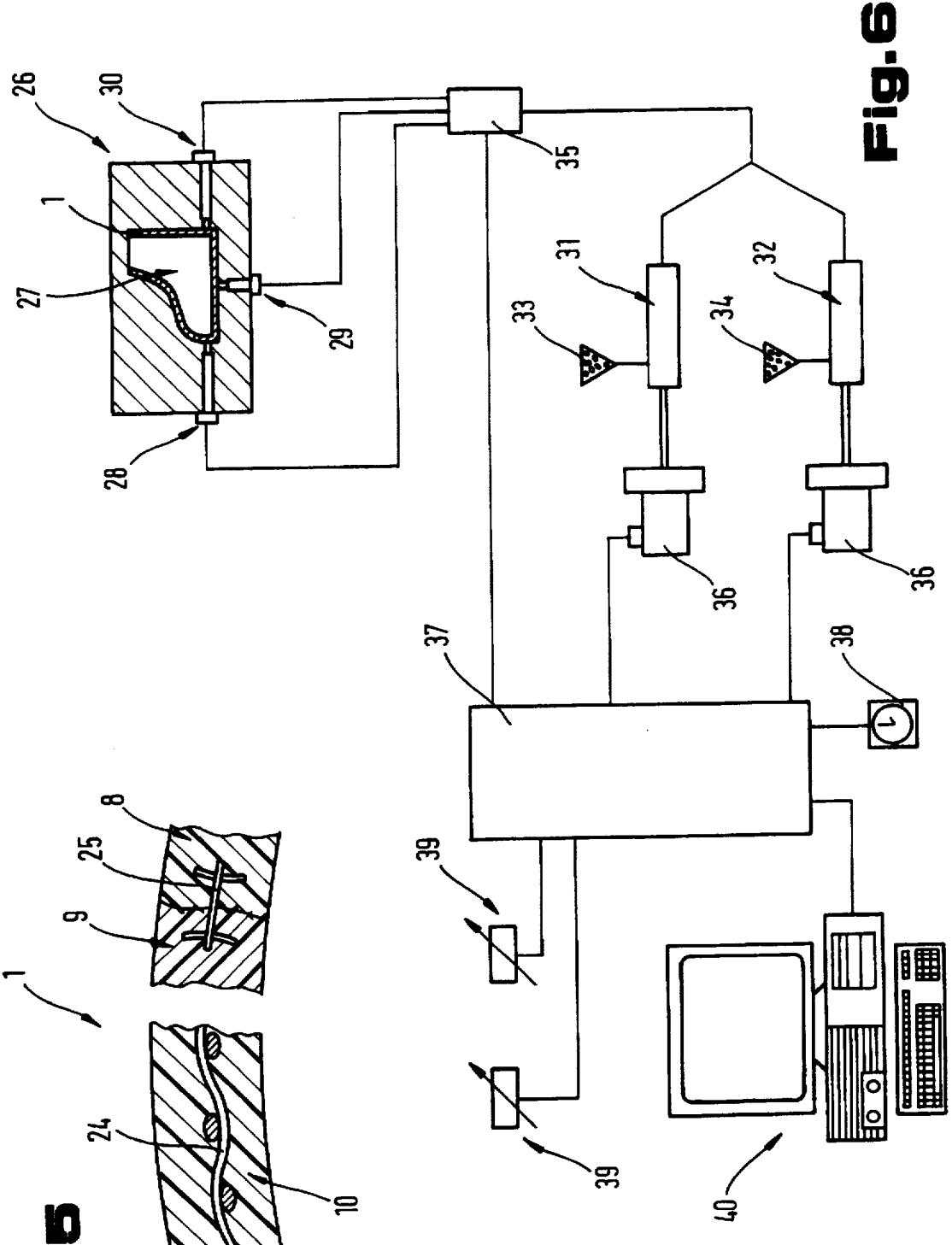

METHOD OF MANUFACTURING AN INJECTION MOLDED SHOE

This is a continuation of application Ser. No. 08/166,507 filed on Dec. 13, 1993, now abandoned which is a divisional of Ser. No. 08/047,878 filed Apr. 15, 1993, now abandoned, which is a continuation of Ser. No. 07/825,934, filed Jan. 27, 1992, now abandoned.

BACKGROUND OF THE INVENTION

1. Field of the Invention

The present invention relates to a shoe comprising an outer shoe of synthetic resin material, and to a method of manufacturing an outer shoe.

2. Description of the Prior Art

A great variety of shoes, particularly ski, ice skating, ice hockey, mounting climbing and work boots, are known, which comprise an outer shoe or shell comprised completely or partly of synthetic resin material. The outer shoe holds the closure devices and an inner shoe into which the foot of the wearer fits. Such outer shoes are sometimes made of several individual parts but usually they are made of a shell and a shank comprised of a single synthetic resin material which imparts the same appearance to the entire outer shoe. However, the shell and the shaft, or individual parts riveted or bonded thereto, may be comprised of different synthetic resin materials having a different appearance or color, for example, or partially reinforcing the shell or the shank, or better adapting them to environmental conditions. However, in these known outer shoes, the individual parts must be riveted or bonded to the outer shoe or the outer shoe must be assembled from such individual parts. This increases the production cost and requires a considerable inventory of individual parts to be stored, which tends to raise the price of such shoes.

SUMMARY OF THE INVENTION

It is the primary object of this invention to provide an integral outer shoe, or an integral part of an outer shoe, which may be readily adapted to a variety of customer requirements without disadvantageously changing the production costs.

The above and other objects are accomplished according to the invention with an integral outer shoe, or an integral part of an outer shoe, including a plurality of shaped portions of at least two different synthetic resin materials, adjacent portions of different synthetic resin materials being interconnected in overlapping transition areas shaped to fit each other.

This seemingly simple solution has the surprising advantage that the combined use of different synthetic resin materials makes it possible to meet all types of customer demands without requiring the manufacture of a large number of different parts. Only a single part or outer shoe need be stored in inventory. It has the further advantage that such products may be exactly reproduced, which makes additional productions possible at short notice if there is further demand for the product. By suitably choosing the colors, UV-resistance and other properties of the different synthetic resin materials, the outer shoes may be tailored to any desired use. For example, by selecting colors that respond differently to varying temperatures for different portions or layers of the outer shoe or outer shoe part, it is possible to equalize extension modulus of the outer shoe of a ski boot and to reduce the stress on the outer shoe when subjected to severe temperatures. It is also possible to use synthetic resin materials of higher mechanical strength at predetermined portions of the outer shoe so that they may be equipped, for example, with pivots or the like.

If the portions of different synthetic resin materials are connected to each other in a plasticized condition, tears in the transition areas will be prevented. Hardening the portions simultaneously will prevent hairline cracks during cooling of the molded shoe portions as well as breaks under stress during wear of the shoe. The designs of the portions may be freely selected.

According to one feature of this invention, adjacent portions of two different synthetic resin materials alternate with each other so as to produce a uniform distribution. The adjacent portions may be superposed layers of different synthetic resin materials.

The synthetic resin materials may differ in composition and/or in color whereby the different portions of the shoe may be simply adjusted to their respective use requirements. If the synthetic resin materials differ in their mechanical properties, such as impact resistance, hardness or resistance to ultraviolet radiation, the more expensive synthetic resin materials meeting these requirements may be limited to those portions of the outer shoe where they are actually needed.

Reinforcing elements may be provided in at least some of the shaped portions to provide desirable reinforcements of the mechanical properties of the synthetic resin material used in such portions. The reinforcing elements may be embedded in the synthetic resin portions so that the appearance of the outer shoe will not be changed thereby.

The shoe may be a ski boot, for example, wherein the outer shoe comprises a shell and a movable shank adjustable relative to the shell, the shaped portions of different synthetic materials being substantially uniformly distributed over the shell and shank. Such a shoe will have uniform strength.

According to another aspect of the invention, an integral outer shoe of the indicated type is manufactured by injecting the different synthetic resin materials in plasticized condition and at staggered intervals into a mold cavity at preselected portions thereof, permitting the injected synthetic resin materials to harden in the mold cavity to form the integral outer shoe, and removing the outer shoe from the mold cavity. The positioning of the portions of different synthetic resin materials in the mold cavity will be facilitated by the staggered timing of the injection of the materials.

According to one feature of the manufacturing method, the different synthetic materials are injected into the mold cavity at different pressures. In this way, surface layers of different synthetic resin materials may be produced on layers of synthetic resin materials previously injected into the mold cavity. If at least one of the different synthetic resin materials is injected into the mold cavity at pressures which vary during the injection of the material, the layers of different synthetic resin materials will be seamlessly laminated to each other to form an integral shaped portion.

According to another preferred feature of the manufacturing method, the lengths of time during which each of the different synthetic resin materials is injected into the mold cavity differ from each other and the injection times are preferably separately controlled whereby the magnitude of the portions of different synthetic resin materials may be determined in a simple manner and thus be adapted to various use requirements.

BRIEF DESCRIPTION OF THE DRAWING

The above and other objects, advantages and features of the present invention will become more apparent from the following detailed description of certain now preferred embodiments thereof, taken in conjunction with the accompanying drawing wherein

FIG. 5 is a like enlarged, fragmentary view showing reinforcing elements in portions and transition areas of the outer shoe; and FIG. 6 schematically illustrates a plant for manufacturing outer shoes according to the invention.

DETAILED DESCRIPTION OF PREFERRED EMBODIMENTS

Figure 1:
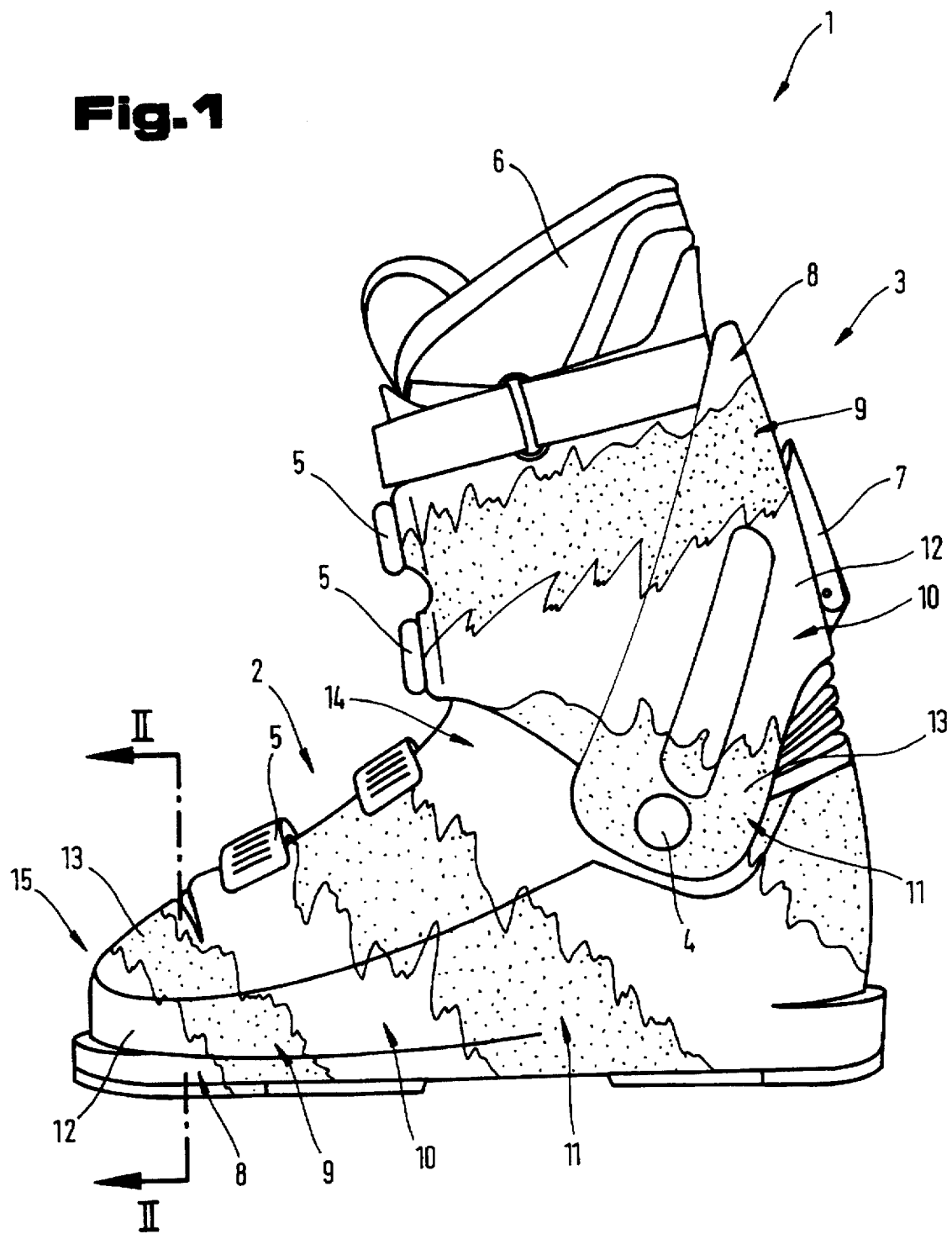
FIG. 1 is a side elevational view of a shoe illustrated as a ski boot comprising an outer shoe according to this invention.

Referring first to FIG. 1, the illustrated shoe is a ski boot comprising integral outer shoe 1 including shell 2 with shank 3 pivotal about axis 4. To close the shoe, outer shoe shell 2 and shank 3 carry buckles 5. Inner shoe 6 is arranged inside outer shoe 1. To adapt to the personal needs of individual wearers, ski boot 1 has adjustment devices 7. Ski boots of this general construction are well known and since this general construction forms no part of the present invention, it is not further described in detail.

Figure 2:
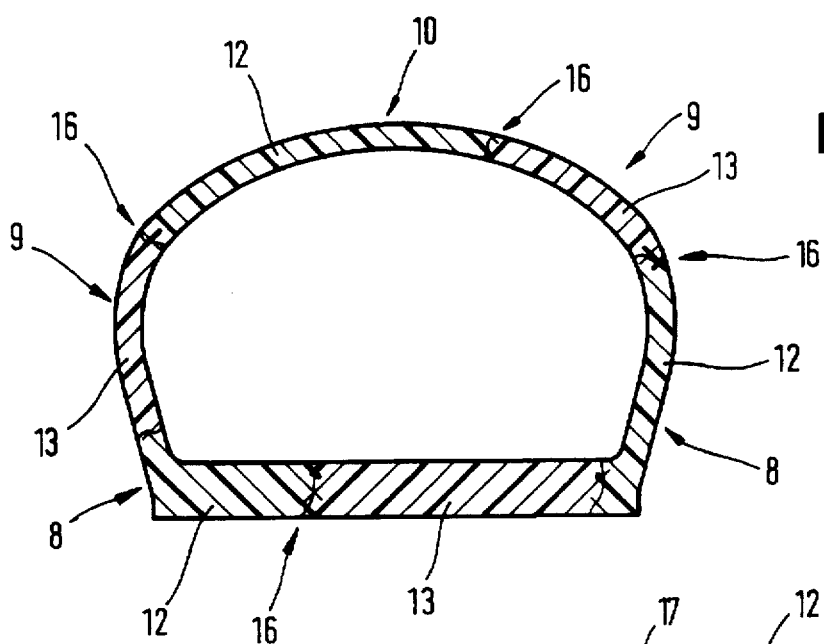
FIG. 2 is a sectional end view of the shoe, taken along line II—II of FIG. 1.

As shown in the drawing, outer shoe shell 2 and its shank 3 include a plurality of shaped portions 8, 9, 10, 11 of at least two different synthetic resin materials 12, 13, adjacent portions of different synthetic resin materials being interconnected in overlapping transition areas 16 shaped to fit each other, as shown in FIG. 2. The illustrated adjacent portions of two different synthetic resin materials alternate with each other. In the embodiments shown in FIGS. 3 and 4, the adjacent portions are superposed layers 17, 18, 19 of different synthetic resin materials.

Synthetic resin materials 12, 13 may differ in composition and/or in color and/or in their mechanical properties, such as impact resistance, hardness or resistance to ultraviolet radiation. For example, synthetic resin materials 12, 13 may be comprised of the same synthetic resin having the same mechanical properties but being differently colored so as to assume thereby different strengths and other properties of wear under the influence of UV-radiation and/or changes of temperature. Thus, the portions of the outer shoe act differently under different temperatures because of their different colors so that they stretch differently to adjust the total stretch of the outer shoe to a desired value. In this way, some of the shoe portions will warm up more than other portions so that tensions between the adjacent shoe portions will be equalized.

It is, of course, also possible to use synthetic resin materials 12, 13 of different mechanical or physical properties in portions 8 to 11. Thus, the materials may be so selected that they assume different colors at varying temperatures or that adjacent portions have different colors at the same temperature. On the other hand, if synthetic resin materials 12, 13 of different impact resistance or elasticity are used, for example, the outer shoe will be adapted more sensitively to various areas of the foot of the wearer. For instance, in portion 11 where pivot 4 is located, synthetic resin material 13 may have a greater strength and rigidity while synthetic material 12 in ankle portion 14 of the outer shoe has a greater elasticity to avoid pressure on the foot of the wearer. It may also be advantageous to use synthetic resin materials of higher ultraviolet radiation resistance in horizontally extending shoe portions than in vertically extending portions.

If shoe 1 is a work boot, it may be advantageous to make tip portion 15 of the shoe of a synthetic resin material 12 which is more deformable and is resistant to penetration.

If desired, more than two different synthetic resin materials may be used for outer shoe portions 8 to 11, 14 and 17 to 19.

As shown in FIG. 2, adjacent portions 9 to 11 of different synthetic resin materials 12, 13 are interconnected in overlapping transition areas 16 shaped to fit each other. This fit at the transition areas is obtained by charging the synthetic resin materials in plasticized condition into a mold cavity and permitting them to cool therein simultaneously so that the seams between the adjacent portions harden into an integral structure. This produces a very firm connection between the adjacent portions of different synthetic resin materials and a more or less homogenous transition between different synthetic resin materials 12, 13 with transitional zones of tension. The simultaneous cooling and hardening of all the outer shoe portions in the mold cavity will impart to outer shoe 2 and shank 3 a very high strength.

Figure 3:
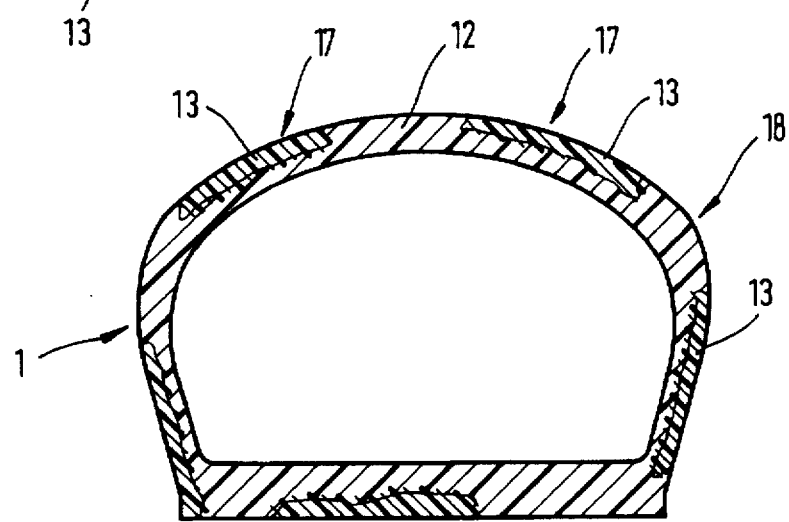
FIGS. 3 and 4 are like views showing two additional embodiments with differently arranged layers of different synthetic resin materials.

FIG. 3 illustrates an embodiment wherein the outer shoe is comprised of a base layer portion 18 of synthetic resin material 12 and superposed layer portions 17 of different synthetic resin material 12 embedded in the base layer portion. This enables the shoe to be partially reinforced along spaced surface areas subjected to the greater stress during wear.

Figure 4:
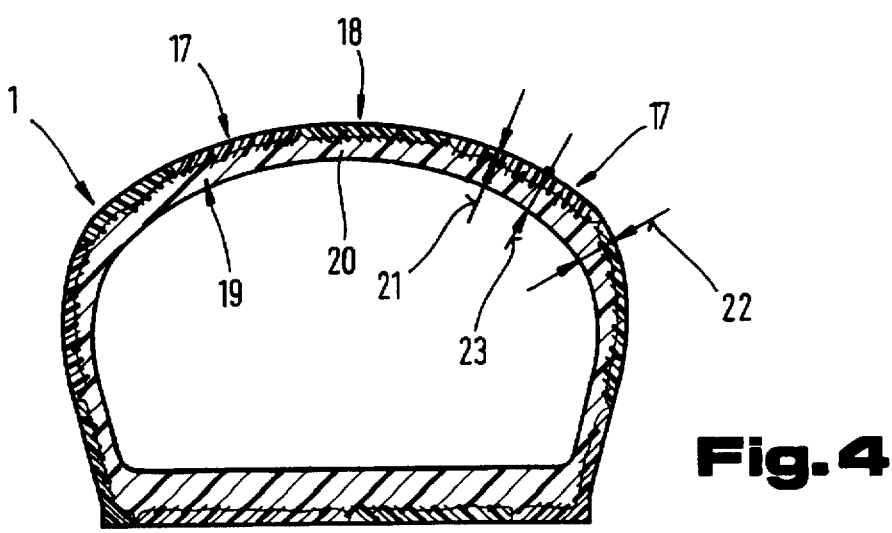

In the embodiment of FIG. 4, the outer shoe is comprised of base layer portion 19 of synthetic material 20 and superposed layer surface layer portions 17', 18' of different synthetic resin materials extending over the entire surface of the base layer portion so that the entire outer shoe is of a multi-layer structure. Portions 17', 18' adjacent to portion 19 as well as portions 17', 18' adjacent to each other are interconnected in overlapping transition areas shaped to fit each other, and surface layer portions 17', 18' are laminated to base layer portion 19. The laminated outer shoe structure has a thickness 22 defined by thickness 21 of surface layer portions 17', 18' and thickness 23 of base layer portion 19. The extension of the individual surface layer portions and their positioning is freely selectable and may be predetermined by suitably controlling the molding process illustrated in FIG. 6 and described hereinafter.

FIG. 5 schematically illustrates an embodiment wherein reinforcing elements 24, 25 are provided in at least some of the shaped portions of the outer shoe. As shown in the drawing, reinforcing element 24 is embedded in shoe portion 10. This may be a fibrous web or net of suitable filaments, for example of glass, carbon or ceramic, which is extruded with the synthetic material forming the reinforced portion. As also shown in the drawing, it is also possible to arrange a reinforcing element 25 in a transition area between shoe portions 8 and 9. Equivalently, it is also possible to embed such reinforcing elements between the layer portions of the outer shoe illustrated in FIGS. 3 and 4. If the manufacturing method permits, metallic reinforcing elements may also be used, for example for reinforcing tip portion 15 of work boots.

The method of manufacturing the integral outer shoe of the invention is illustrated in FIG. 6. As shown, shoe 1 is manufactured in mold 26 defining mold cavity 27. Sprues 28, 29, 30 lead into mold cavity 27 and are connected to extruders 31, 32 for plasticizing synthetic resin materials 33, 34 so that the synthetic resin materials are injected into the mold cavity in plasticized condition. Distributing valve 35 is arranged in the conduits leading from the outputs of extruders 31, 32 to sprues 28, 29, 30 for distributing the plasticized synthetic resin materials into mold cavity 27 at pre-selected portions thereof. Synthetic resin materials 33, 34 are stored in suitable hoppers in granulated form for feeding into the extruders.

Extruders 31, 32 are driven by motors 36, 36 whose operation is controlled by control device 37 which includes timer 38, adjustment elements 39 and input terminal 40 which may comprise a microprocessor. The adjustment elements 39 and input terminal 40 enable the operation of extruder drive motors 36 to be programmed so that the drive motors may be actuated for different lengths of time, for example alternately, simultaneously or to produce different pressures in the extruders. Correspondingly, distributor valve 35 will determine at what staggered time intervals and at what portions of mold cavity 27, i.e. through which sprue 28, 29, 30, the synthetic resin materials plasticized in extruders 31, 32 will be injected. For example, if the plasticized synthetic resin fluids are alternately injected through sprue 28 and/or 30, the synthetic resins will be injected into mold cavity 27 in planes causing shoe portions 8 to 11 or layers 17 to 19 to be formed successively in the mold cavity where the successive portions or layers will melt into each other. If the plasticized synthetic resin material is injected through sprue 29, the superposed layers will extend substantially parallel to the sole.

A number of variations of the injection of the plasticized synthetic resin materials into the mold cavity are conceivable, for example injection through a plurality of sprues in different directions alternatingly, simultaneously, successively and overlappingly. For instance, layer portions 17 to 19 may be produced by first injecting the plasticized synthetic resin material for base layer portion 19 and then injecting synthetic resin materials under a pressure exceeding that prevailing in mold cavity 27 to laminate layer portions 17, 18 to base layer portion 19.

Since the injected synthetic resin materials will flow into each other at their interfaces so that a fluid transition area is produced between adjacent portions or layers, different synthetic resin materials 12, 13 will mesh into each other and thus produce a permanent bonding therebetween upon hardening of the synthetic resin material portions in the mold cavity to form integral outer shoe 1. After hardening, the outer shoe is removed from the mold cavity. No cracks or breaks will appear in the transition areas between the different synthetic resin materials.

It should be noted that the present invention may be usefully applied not only to ski boots, as described by way of example, but to all types of shoes and boots which comprise outer shoes of synthetic resin material. Also, if desired, parts of such outer shoes may be manufactured in this fashion so that wherever the specification and the claims refer to an "outer shoe" this term includes a part of an outer shoe.

Useful synthetic resins for molding the outer shoe include Polyurethane, Polypropylene, Polyamide, preferably Polyurethane with an admixture of UV-radiation resistant materials include UV-stabilizer. By way of example up to 5% colored granulated material is admixted to synthetic resin material for purpose of coloration.

To carry out the method of manufacturing a ski boot according to the invention, two extruders with several nozzles connected to the mold cavity are connected in series. According to another embodiment of carrying out the manufacturing method, a two-worm machine with a nozzle equipped with two independently operable closures may be used. With a conventional interval injection molding method, the two extruders or worms are alternately operated after the start. They alternately injection-mold in intervals until the outer skin of the ski boot has been supplied with sufficient material. Thereupon, the core is filled without interval by both extruders or worms. Each nozzle associated with a worm is operated simultaneously with the extruder worms.

The technical parameters, such as operating times, pressures, intervals, temperatures, depend on the shapes, sizes, material and color. For example, the following technical parameters apply to a ski boot of size 275 mm corresponding to the length of the sole, for the material designated API 191:

Cycle time: 150 seconds
Injection time: 8 seconds
After-pressure time: 50 seconds
Cooling time: 70 seconds
Injection pressure: 100 bar
After-pressure: 30 bar
Temperature of the mass: 210° C.
Removal temperature: 70° C.

The indicated injection time of 8 seconds is the total sum of, for example, two nozzles filling the mold cavity in an interval method, including the intervals during which the material flow through the nozzles is interrupted.

What is claimed is:

1. A method for manufacturing an integrally-formed injection molded shoe article, comprising the steps of:
   coupling a distributing valve to a first extruder and a second extruder;
   connecting a control device comprising a microprocessor to said first extruder, said second extruder and said distributing valve;
   coupling a plurality of sprues of a mold to a corresponding plurality of outlets of said distributing valve via respective supply conduits;
   plasticizing a first synthetic resin material in the first extruder and a second different synthetic resin material in the second extruder;
   controlling the length of time of actuation of each of said first and second extruders, with said control device, to produce different pressures in said extruders;
   operating said distributing valve with said control device, to (i) select at least one outlet and corresponding supply conduit for successively receiving the first and second synthetic resin materials and (ii) control the length of time for said at least one selected outlet and corresponding supply conduit to successively receive the first and second synthetic resin materials;
   injecting the first and second synthetic resin materials successively through the respective sprue into the mold cavity so that the molten first and second synthetic resin materials flow into each other;
   wherein the different synthetic resin materials are injected into the mold cavity at different pressures;
   wherein at least one of the different synthetic resin materials is injected into the mold cavity at a pressure which varies during the injection of the synthetic resin material;

permitting the injected synthetic resin materials to harden in the mold cavity and permanently bond together to form an integral injection molded shoe article; and removing the shoe article from the mold cavity.

2. The manufacturing method of claim 1, wherein the lengths of time during which each of the different synthetic resin materials is injected into the mold cavity differ from each other.

3. The manufacturing method of claim 2 wherein the lengths of the injection times are separately controlled by controlling said distributing valve accordingly.

4. The manufacturing method of claim 1, further comprising the steps of programming the operation of said first and second extruders and said distributing valve.

5. The manufacturing method of claim 4, wherein the different synthetic resin materials are alternately introduced into each of two conduits for injection through two sprues into the mold cavity.

* * * * *